(12) United States Patent
Matoba et al.

(10) Patent No.: US 8,098,389 B2
(45) Date of Patent: Jan. 17, 2012

(54) IMAGE PROCESSING APPARATUS, WORKFLOW TESTING METHOD AND WORKFLOW TESTING PROGRAM

(75) Inventors: Kazuo Matoba, Akashi (JP); Tomoyuki Okamoto, Suita (JP); Tomo Tsuboi, Itami (JP); Yoshinori Sugahara, Kyoto (JP); Satoshi Deishi, Ibaraki (JP); Kagumi Moriwaki, Kawanishi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 964 days.

(21) Appl. No.: 12/058,176

(22) Filed: Mar. 28, 2008

(65) Prior Publication Data

US 2008/0266578 A1  Oct. 30, 2008

(30) Foreign Application Priority Data

Apr. 26, 2007  (JP) .................................. 2007-117750

(51) Int. Cl.
*G06F 15/00* (2006.01)
*G06F 3/12* (2006.01)
*G06K 1/00* (2006.01)
*G06K 15/00* (2006.01)

(52) U.S. Cl. ...................................... 358/1.15; 358/1.14

(58) Field of Classification Search .................. None
See application file for complete search history.

(56) References Cited

U.S. PATENT DOCUMENTS

| 5,706,333 | A * | 1/1998 | Grenning et al. ............. 455/423 |
| 6,665,425 | B1 | 12/2003 | Sampath et al. |
| 2003/0233341 | A1 | 12/2003 | Taylor et al. |
| 2005/0136559 | A1 | 6/2005 | Toyofuku |
| 2007/0027733 | A1 | 2/2007 | Bolle et al. |

FOREIGN PATENT DOCUMENTS

| JP | 7-248940 | 9/1995 |
| JP | 2001-245091 | 9/2001 |
| JP | 2003-276150 | 9/2003 |
| JP | 2005-92364 | 4/2005 |
| JP | 2005-182635 | 7/2005 |
| JP | 2005-527916 | 9/2005 |
| JP | 2007-42096 | 2/2007 |

OTHER PUBLICATIONS

Japanese Office Action mailed on Jun. 2, 2009 directed at counterpart application No. 2007-117750; 8 pages.

* cited by examiner

*Primary Examiner* — Douglas Tran
(74) *Attorney, Agent, or Firm* — Morrison & Foerster LLP

(57) ABSTRACT

An image processing apparatus comprising: a test data generator that generates test data instead of actual data entered for executing a workflow consisting of a plurality of unit works, if an instruction is given to test the workflow; a test process executor that executes a test process by processing the generated test data according to parameters for executing the unit works; a test process suspender that suspends the test process if a trouble happens during the test process; a notifier that notifies a user of a trouble if it happens during the test process; a parameter modifier that is capable of modifying the parameters if the test process is suspended due to the trouble; and a test process resuming portion that resumes the test process after the parameters are modified.

12 Claims, 13 Drawing Sheets

| Order to Process | Process | Parameters |
|---|---|---|
| 1 | Scan | Resolution : 600dpi   Color : 24bit |
| 2 | Transfer to Server | Server Address : 192.999.1.100   Protocol : SMB<br>Shared Folder Path : Shared_Information/Design/Report |
| 3 | Transmit | Reply to : MFP2   Protocol : SMB |
| 4 | Print | Resolution : 600dpi   Color : 24bit |

| Order to Process | Process | Parameters |
|---|---|---|
| 1 | Scan | Resolution : 600dpi   Color : 24bit |
| 2 | Transfer to Server | Server Address : 192.999.1.100   Protocol : SMB<br>Shared Folder Path : Shared_Information/Design/Report |
| 3 | Transmit | Reply to : MFP2   Protocol : SMB |
| 4 | Print | Resolution : 600dpi   Color : 24bit |

FIG.4

| Order to Process | Process | Parameters |
|---|---|---|
| 1 | Scan | Resolution : 300dpi   Color : 8bit |
| 2 | Transfer to Server | Server Address : 192.999.100.1   Protocol : SMB<br>Shared Folder Path :<br>Shared_Design_Information/Report/2008 |
| 3 | Transmit | Reply to : MFP2   Protocol : SMTP |
| 4 | Print | Resolution : 300dpi   Color : 8bit |

FIG.5

| User Name | Notify of Trouble | | Permit Parameter Setting |
|---|---|---|---|
| | Set | Method | |
| Sato | × | — | × |
| Tanaka | ○ | Panel | ○ |
| | ○ | E-mail (Tanaka@abc.co.jp) | |
| ⋮ | ⋮ | ⋮ | ⋮ |

IMAGE PROCESSING APPARATUS, WORKFLOW TESTING METHOD AND WORKFLOW TESTING PROGRAM

This application claims priority under 35 U.S.C. §119 to Japanese Patent Application No. 2007-117750 filed on Apr. 26, 2007, the entire disclosure of which is incorporated herein by reference in its entirety.

BACKGROUND OF THE INVENTION

1. Field of the Invention

The present invention relates to an image processing apparatus that is applied to a MFP (Multi Function Peripheral) and etc. capable of executing workflows, a workflow testing method, and a workflow testing program stored in a computer readable recording medium to make a computer execute a workflow test process.

2. Description of the Related Art

The following description sets forth the inventor's knowledge of related art and problems therein and should not be construed as an admission of knowledge in the prior art.

There exists an image processing apparatus that is heretofore known for its functions of setting a workflow consisting of a plurality of unit works, and executing the workflow, by executing the respective unit works according to parameters for executing the unit works.

To take advantage of such an image processing apparatus above, according to Japanese Unexamined Laid-open Patent Publication No. H7-248940, it is suggested that information required for executing respective unit works of a workflow is automatically obtained, and the respective unit works are executed according to the obtained information.

Further, according to Japanese Unexamined Laid-open Patent Publication No. 2005-92364, it is suggested that a plurality of workflows are prepared, and a preferable one is selected from the plurality of workflows in consideration of a process executed in a location of use.

Still further, according to Japanese Unexamined Laid-open Patent Publication No. 2003-276150, it is suggested that processes and parameters are preliminarily specified and those can be set for a workflow depending on an entered keyword.

Conventionally, if a workflow used in a division is needed to be introduced to a different division without changing unit works constituting the workflow, parameters for executing the unit works may need to be changed depending on configurations and capabilities/performances of machines used in the respective divisions. And if the parameters need to be changed, the workflow is practically executed to examine a processing result, and then if a trouble happens, the workflow is executed again with modified parameters to examine a processing result, and thereby parameters are eventually determined. These conventional operations require a considerable amount of time and efforts to adjust a workflow.

However, with these arts in the publications mentioned above, necessary information for executing a workflow is obtained, and the workflow and parameters can be selected from a plurality of those preliminarily registered, when the workflow is executed. In other words, these arts do not have a perfect solution against the aforementioned inconvenience: a considerable amount of time and efforts possibly arising if a workflow used in a division is needed to be introduced to a different division.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing apparatus that is capable of making it easier to adjust a workflow used in an environment to a different environment if the workflow is needed to be introduced thereto, and thereby contributes to promotion of using workflows and productivity of operations.

It is another objective of the present invention to provide a workflow testing method that is capable of making it easier to adjust a workflow used in an environment to a different environment if the workflow is needed to be introduced thereto, and thereby contributes to promotion of using workflows and productivity of operations.

It is yet another objective of the present invention to provide a workflow testing program stored in a computer readable recording medium to make a computer execute processing by the workflow testing method.

According to a first aspect of the present invention is an image processing apparatus comprises:
   a test data generator that generates test data instead of actual data entered for executing a workflow consisting of a plurality of unit works, if an instruction is given to test the workflow;
   a test process executor that executes a test process by processing the generated test data according to parameters for executing the unit works;
   a test process suspender that suspends the test process if a trouble happens during the test process;
   a notifier that notifies a user of a trouble if it happens during the test process;
   a parameter modifier that is capable of modifying the parameters if the test process is suspended due to the trouble; and
   a test process resuming portion that resumes the test process after the parameters are modified.

According to a second aspect of the present invention is an image processing apparatus comprises:
   a receiver that receives test data for executing a workflow and parameters for executing unit works constituting the workflow, which are transmitted from another image processing apparatus;
   a test process executor that executes a test process by processing the received test data according to the parameters; and
   a transmitter that transmits a notice of a trouble to the other image processing apparatus, if the trouble happens while the test process executor is executing the test process.

According to a third aspect of the present invention is a workflow testing method comprises:
   generating test data instead of actual data entered for executing a workflow consisting of a plurality of unit works, if an instruction is given to test the workflow;
   executing a test process by processing the generated test data according to parameters for executing the unit works;

suspending the test process if a trouble happens during the test process;
notifying a user of a trouble if it happens during the test process;
modifying the parameters if the test process is suspended due to the trouble; and
resuming the test process after the parameters are modified.

According to a fourth aspect of the present invention is a workflow testing program stored in a computer readable recording medium to make a computer execute:
generating test data instead of actual data entered for executing a workflow consisting of a plurality of unit works, if an instruction is given to test the workflow;
executing the test process by processing the test data according to parameters for executing the unit works;
suspending the test process if a trouble happens during the test process;
notifying a user of a trouble if it happens during the test process;
modifying the parameters if the test process is suspended due to the trouble; and
resuming the test process after the parameters are modified.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a table showing an example of a workflow not having been tested;

FIG. 5 is a table showing an example of a workflow adjusted based on test processing results;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
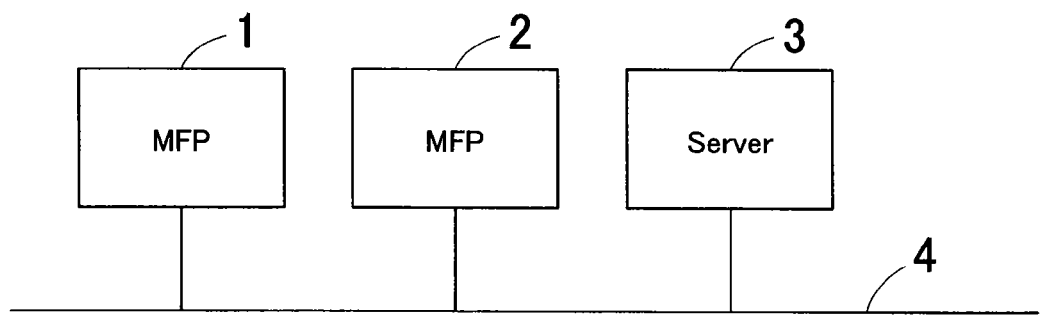
FIG. 1 is a view showing a configuration of a network system in which a MFP is used as an image processing apparatus according to one embodiment of the present invention.

FIG. 1 is a view showing a configuration of a network system in which a MFP is used as an image processing apparatus according to one embodiment of the present invention.

As shown in FIG. 1, this network system comprises a plurality of MFPs: a MFP 1 and a MFP 2, and a server 3. The MFP 1, the MFP 2 and the server 3 are interconnected via a network 4 such as a LAN.

The server 3 has the function to hold shared folders as a file server, and the function to convert formats and perform various image processes as a server. The server 3 communicates with the MFPs 1 and 2 by using protocols available under a user's using network environment.

Figure 2:
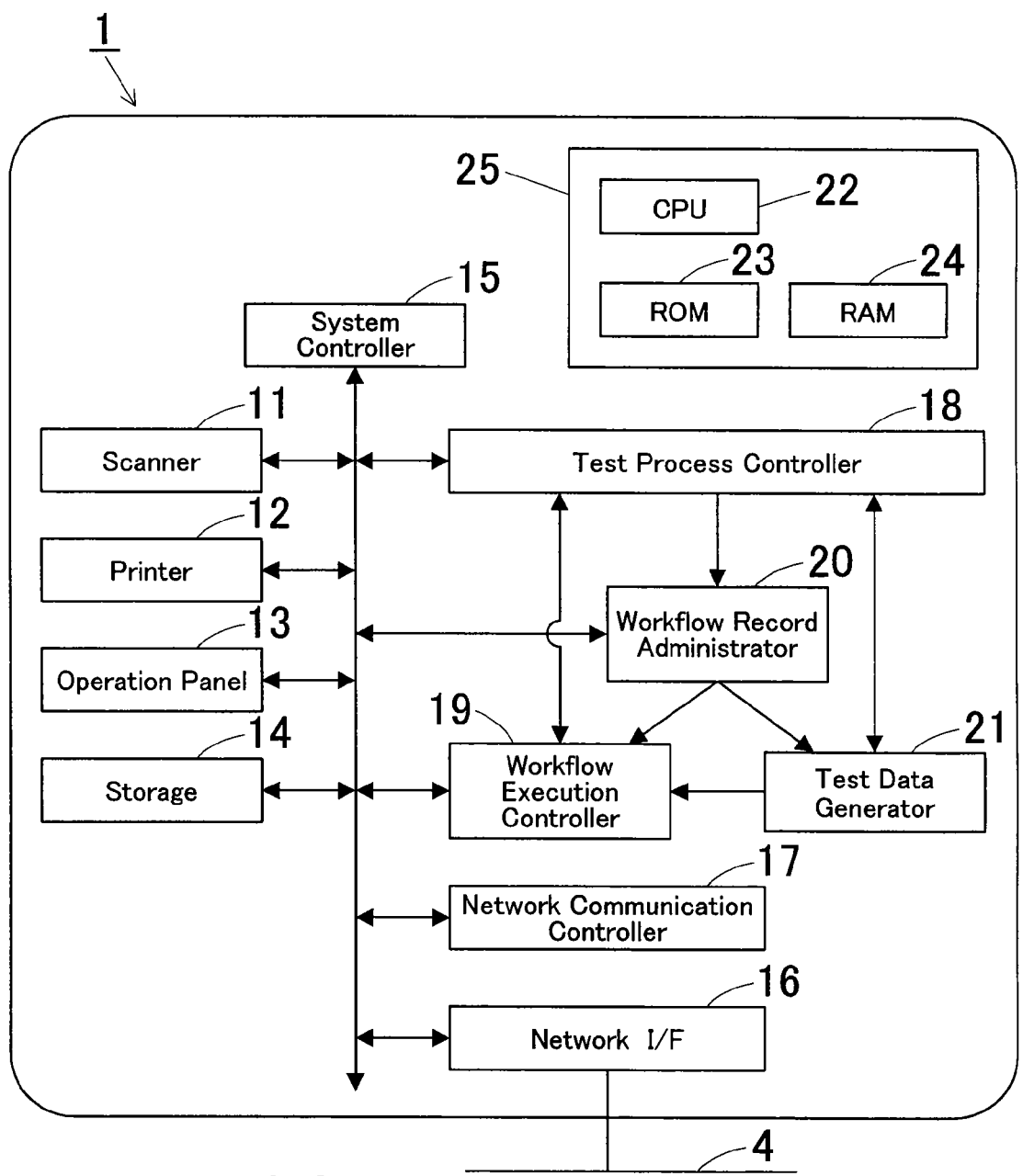
FIG. 2 is a block diagram showing an electrical configuration of the MFP.

FIG. 2 is a block diagram showing an electrical configuration of the MFPs 1 and 2. Hereinafter, the MFP 1 will be explained on behalf, since the MFPs 1 and 2 have the same basic configuration.

As shown in FIG. 2, the MFP 1 comprises a scanner 11, a printer 12, an operation panel 13, a storage 14, a system controller 15, a network interface (I/F) 16, a network communication controller 17, a test process controller 18, a workflow execution controller 19, a workflow record administrator 20 and a test data generator 21.

The scanner 11 generates electrical data by reading a paper document. The printer 12 prints the electrical data read out from a paper document by the scanner 11, or data received from an external apparatus such as the MFP 2, on the network 4.

The operation panel 13 performs various entry operations, and displays conditions settings and etc.

The storage 14 provides a recording area necessary to execute processes, and a hard disk drive, for example, is employed as the storage 14.

The system controller 15 centrally controls all the operations and functions of the MFP 1.

The network I/F 16 receives data via the network 4 from the MFP 2 and the server 3 that are external apparatuses, or transmits data to the network 4 from the MFP 1.

The network communication controller 17 converts data such as file data, to network packets then transmits to the network 4 via the network I/F 16. Also, it receives network packets via the network I/F 16 and picks up data therefrom, and then transfers the data to predetermined portions of the MFP 1.

The test process controller 18 controls the entire workflow test process. In addition, the test process controller 18 examines the status of a workflow test process and parameter matching, and suspends the workflow test process if parameters are not appropriate, and resumes the workflow test process if a resumption instruction is given after the parameters are modified.

Under the control of the test process controller 18, the workflow execution controller 19 makes respective function modules provided inside and outside of the MFP 1 execute a workflow according to unit works constituting the workflow.

The workflow record administrator 20 administers workflows recorded in the storage 14. Concretely, the workflow record administrator 20 transmits information of a list of a workflow to be tested to the operation panel 13, and sets unit works as a workflow to be tested, on the workflow execution controller 19, and also gives the test completion status to a workflows just having been tested, according to commands received from the test process controller 18.

The test data generator 21 obtains from the workflow record administrator 20, information of a workflow selected as a test target, then generates test data suitable for testing the workflow, and then provides the data to the workflow execution controller 19.

Functions of the system controller 15, the network communication controller 17, the test process controller 18, the workflow execution controller 19, the workflow record administrator 20, the test data generator 21 and etc. are executed by a computer system 25 comprising a CPU 22, a ROM 23, a RAM 24 and etc.

In the MFP 1 explained above, if an instruction given to test a workflow is accepted via the operation panel 13, the test data generator 21 generates test data instead of actual data entered for executing the workflow, then the test data is processed according to parameters and thereby a test process is executed. If a trouble happens during the test process, the test process controller 18 suspends the test process.

Subsequently, a user is notified of the trouble. And if the parameters are modified, the test process controller 18 resumes the workflow test process.

As described above in this embodiment, if a workflow used in an environment is needed to be introduced to a different environment, a test process is executed, and thereby parameters can be modified then a test process can be executed again, easily. With this embodiment, it becomes easier to adjust a workflow, in other words, a workflow used in an environment can be adjusted to a different environment without a considerable amount of time and efforts, which would contribute to productivity of operations.

Figure 3:
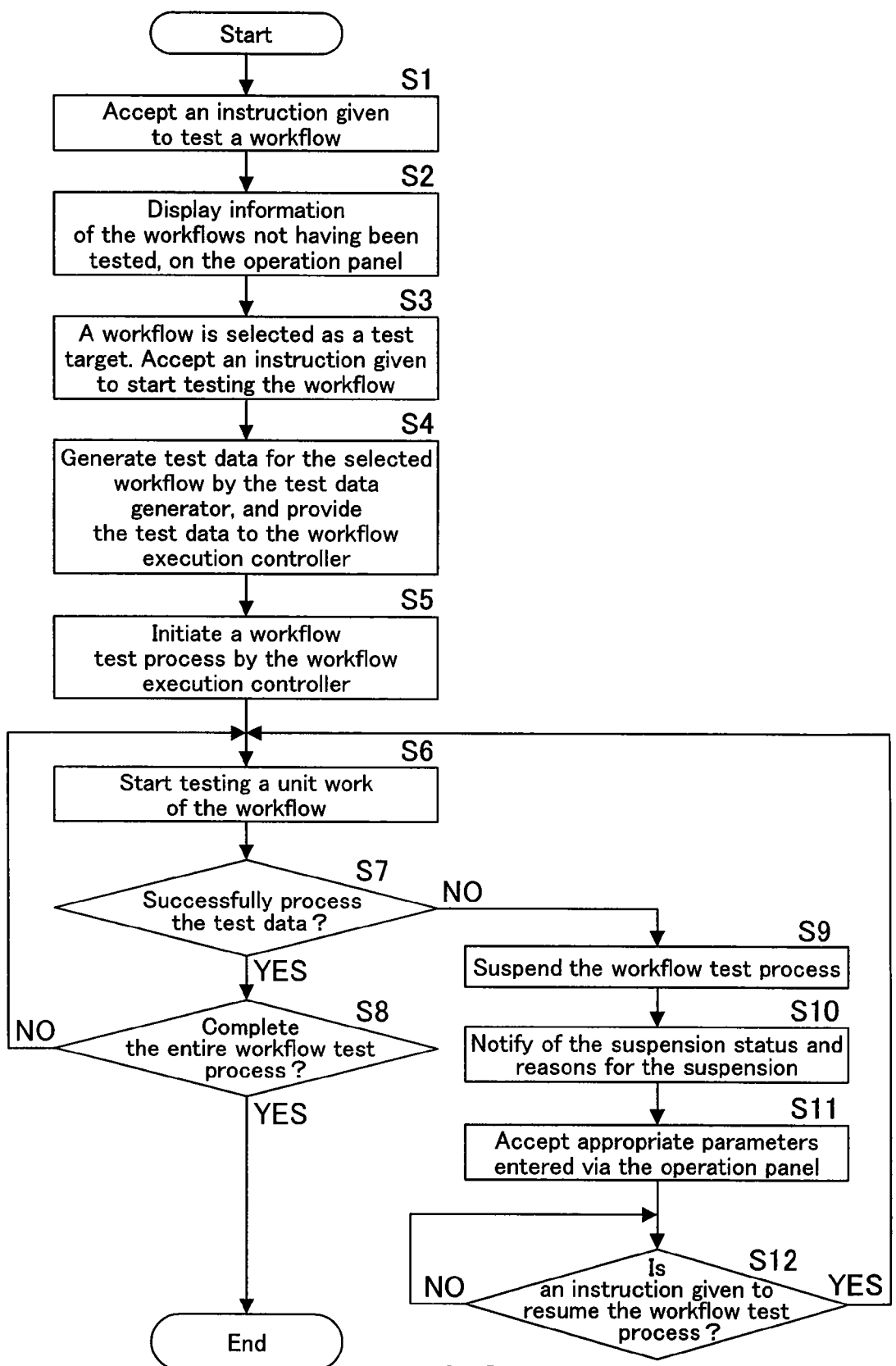
FIG. 3 is a flowchart showing a procedure executed in the MFP, to test a workflow.

FIG. 3 is a flowchart showing a procedure to test a workflow. Actually, this procedure and the other procedures to be explained with the following flowcharts are executed by the CPU 22 according to a program stored in a recording medium such as the ROM 23.

As shown in FIG. 3, a user gives an instruction to test a workflow via the operation panel 13, and this instruction is accepted in Step S1. In Step S2, information of the workflows not having been tested is obtained from the workflow record administrator 20, and the workflows are listed on the operation panel 13. Then, the user selects a workflow as a test target from those not having been tested and gives an instruction to start executing a test process, and this instruction is accepted in Step S3.

In Step S4, test data is generated by the test data generator 21 for the selected workflow, and provided to the workflow execution controller 19. Then a workflow test process is initiated by the workflow execution controller 19 in Step S5, and a unit work of the workflow is started to be tested, in Step S6.

When a unit work of the workflow is tested, it is judged by the test process controller 18 in Step S7, whether or not the test data is successfully processed, in order to examine if various parameters preliminarily set on the MFP2 or the server 3 related to this unit work are appropriate. If it is successfully processed (YES in Step S7), then it is judged in Step S8 whether or not the entire workflow test process is completed. If it is completed (YES in Step S8), the routine terminates. If it is not yet completed (NO in Step S8), the routine returns to Step S6 and starts testing a following unit work of the workflow.

In Step S7, if the test data is not successfully processed due to parameter mismatch (NO in Step S7), the workflow test process is suspended in Step S9. Then in Step S10, the status indicating the workflow test process is suspended and reasons for the suspension are displayed on the operation panel 13 to let the user know, and parameter modification and re-entry are requested.

In Step S11, appropriate parameters entered by the user via the operation panel 13 is accepted. Then, it is judged in Step S12 whether or not an instruction is given by the user to resume the test process. If a resumption instruction is not given (NO in Step S12), the routine waits until it is given. If a resumption instruction is given (YES in Step S12), the routine returns to Step S6 and this unit work of the workflow is started to be tested again.

In the test process of FIG. 3, a workflow is tested from the first unit work to the last unit work. Alternatively, a workflow can be tested from an arbitrary unit work to another arbitrary unit work that follows, i.e. one or more than one unit works can be tested as a workflow. Further, if a workflow is tested from a unit work related to an external apparatus such as the server 3 and the server 3 is not capable of generating test data, the MFP 1 preferably generates test data for a unit work that is executed by the MFP 1 before the unit work related to the server 3.

FIG. 4 is a table showing an example of a workflow not having been tested.

As shown in FIG. 4, this workflow consists of four unit works (unit works 1 through 4). In this embodiment, the unit work 1 is "scan", the unit work 2 is "transfer to server", the unit work 3 is "transmit", and the unit work 4 is "print". This workflow was used in a different division and the parameters preliminarily set as shown herein are those used in that division.

Hereinafter, operations to test this workflow in the system environment shown in FIG. 1 will be explained.

If an instruction is given via the MPF 1 to test the workflow, "scan" that is the unit work 1 is tested, firstly. The MFP 1 is capable of executing "scan" according to its parameters as is, thus "scan" is successfully executed. And secondly, the unit work 2 is tested.

When "transfer to server" that is the unit work 2 is tested, communication cannot be established because of differences from the different division, in the address of the server 3, the shared folder path and the folder name, thus the test process is suspended. And the user is requested to set appropriate parameters.

Subsequently, the test process is resumed and "transmit" that is the unit work 3 is tested. However, communication cannot be established because the MFP2 that is the transmission destination does not support the SMB (Server Message Block) protocol, thus the test process is suspended again. And the user is requested to change the protocol to the SMTP (Simple Mail Transfer Protocol) protocol to enable communication, and accordingly gives an instruction to resume the test process.

When "print" that is the last unit work 4 is tested, the test process is suspended again because the MFP 2 is not capable of executing the process according to the specified resolution and color. And the user is requested to set appropriate values of resolution and color. At the same time, the values of resolution and color preliminarily set on "scan" that is the unit work 1 should be changed, and the user is also requested to modify the values of parameters preliminarily set on "scan", under the control of the workflow execution controller 19.

By obtaining test processing results in this way above, parameters mismatch possibly arising if a workflow used in a division is introduced to a different division, can be modified, i.e. appropriate parameters for a use environment can be set.

FIG. 5 is a table showing an example of a workflow adjusted based on test processing results.

As shown in FIG. 5, differences from FIG. 4 showing a workflow not having been tested are in that the resolution and the color set on "scan" that is the unit work 1 and "print" that is the unit work 4 are modified, the server address and the shared folder path set on "transfer to server" that is the unit work 2 are modified, and the transmission protocol set on "transmit" that is the unit work 3, are modified, respectively.

In the workflow test process of FIG. 4, an image data file is generated based on the parameters set on "scan" that is the unit work 1, and the image data file is used for executing "transfer to server" that is the unit work 2 is tested.

Meanwhile, a workflow can include unit works executed in an external apparatus such as the MFP 2. In this case, if an instruction is given to test a unit work executed in the MFP 2 or a workflow including the unit work, the unit work is tested in the MFP 2.

If the unit work is tested in the MFP 2, as well as parameters for executing the unit work and generated test data are provided to the MFP 2 via the network communication controller 17. If a trouble happens in the MFP 2 during executing the function, the workflow test process is suspended. On the other hand in the MFP 1, a notice of the trouble is received and the user is notified, and the parameters are modified and set on the unit work executed in the MFP 2. Then the workflow test process is resumed in the MFP 2.

Figure 6:
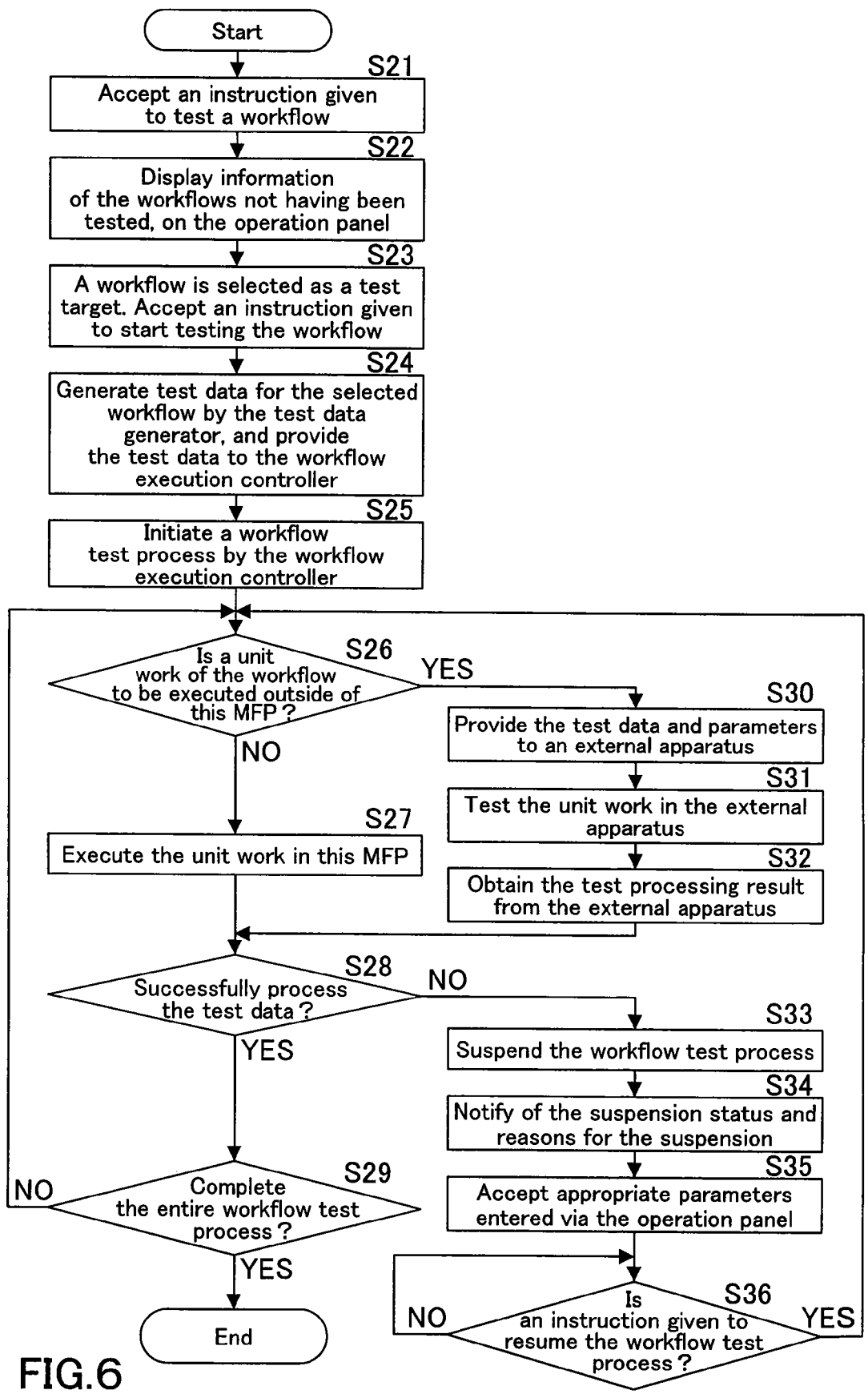
FIG. 6 is a flowchart showing a procedure to make an external apparatus execute a workflow test process.

FIG. 6 is a flowchart showing a procedure executed in the MFP 2 that is an external apparatus, to test at least one unit work of a workflow.

As shown in FIG. 6, a user gives an instruction to test a workflow via the operation panel 13, and this instruction is accepted in Step S21. In Step S22, information of the workflows not having been tested is obtained from the workflow record administrator 20, and the workflows are listed on the operation panel 13. Then, the user selects a workflow as a test target from those not having been tested and gives an instruction to start executing a test process, and this instruction is accepted in Step S23.

In Step S24, test data is generated by the test data generator 21 for the selected workflow and provided to the workflow execution controller 19. Then a workflow test process is initiated by the workflow execution controller 19, in Step S25.

In Step S26, it is judged whether or not a unit work of the workflow is to be executed outside of the MFP 1. If the unit work is not to be executed outside of the MFP 1 (NO in Step S26), the unit work is executed in the MFP 1 in Step S27, then the routine proceeds to Step S28. If the unit work is to be executed outside of the MFP 1 (YES in Step S26), the test data and the parameters are provided to the MFP 2 that is an external apparatus, in Step S30.

Subsequently, the MFP 1 makes the MFP2 test the unit work in Step S31, and the test processing result is obtained from the MFP 2 in Step S32. Then the routine proceeds to Step S28.

In Step S28, it is judged whether or not the test data is successfully processed. If it is successfully processed (YES in Step S28), then it is judged in Step S29 whether or not the entire workflow test process is completed. If it is completed (YES in Step S29), the routine terminates. If it is not yet completed (NO in Step S29), the routine returns to Step S26 and starts testing a following unit work of the workflow.

If the test data is not successfully processed due to parameter mismatch (NO in Step S28), the workflow test process is suspended in Step S33. Then in Step S34, the status indicating the workflow test process is suspended and reasons for the suspension are displayed on the operation panel 13 to let the user know, and parameter modification and re-entry are requested.

Subsequently in Step S35, appropriate parameters entered by the user via the operation panel 13 are accepted. And it is judged in Step S36 whether or not an instruction is given by the user to resume the test process. If an instruction is not given to resume the test process (NO in Step S36), the routine waits until it is given. If a resumption instruction is given (YES in Step S36), the routine returns to Step S26.

Figure 7:
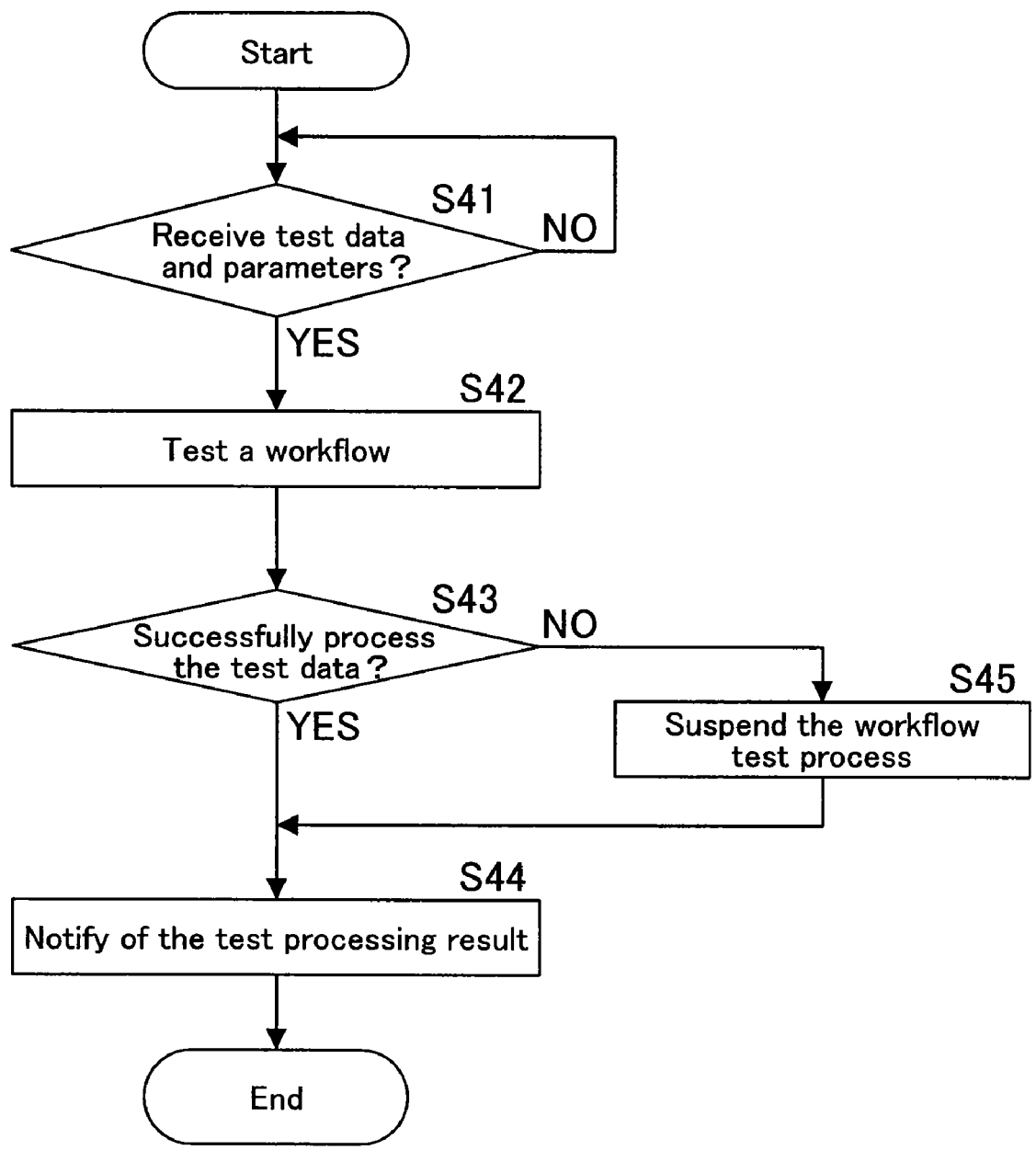
FIG. 7 is a flowchart showing a procedure executed in the external apparatus, to test a workflow.

FIG. 7 is a flowchart showing a procedure executed in the MFP 2 if the MFP 2 receives test data and parameters.

In Step S41, it is judged whether or not test data and parameters are received. If those are not received (NO in Step S41), the routine waits until those are received.

If those are received (YES in Step S41), a workflow (a unit work) is tested in Step S42, and it is judged in Step S43 whether or not the test process is successfully executed.

If the test process is successfully executed (YES in Step S43), a notice of process succeed is transmitted to the MFP 1. If the test process is not successfully executed (NO in Step S43), the workflow test process is suspended in Step S45, then the routine proceeds to Step S44 in which a notice the status indicating the workflow test process is suspended and reasons for the suspension are transmitted to the MFP 1.

In the test process of FIG. 6 and FIG. 7, a test process is suspended if a trouble happens while any unit work is being tested. Alternatively, it can be configured such that inappropriate parameters are changed to appropriate ones in the MFP 1, then a test process is executed in the MFP 2. In this case, a user is notified of parameters necessary to be modified, depending on a test processing result.

Figure 8:
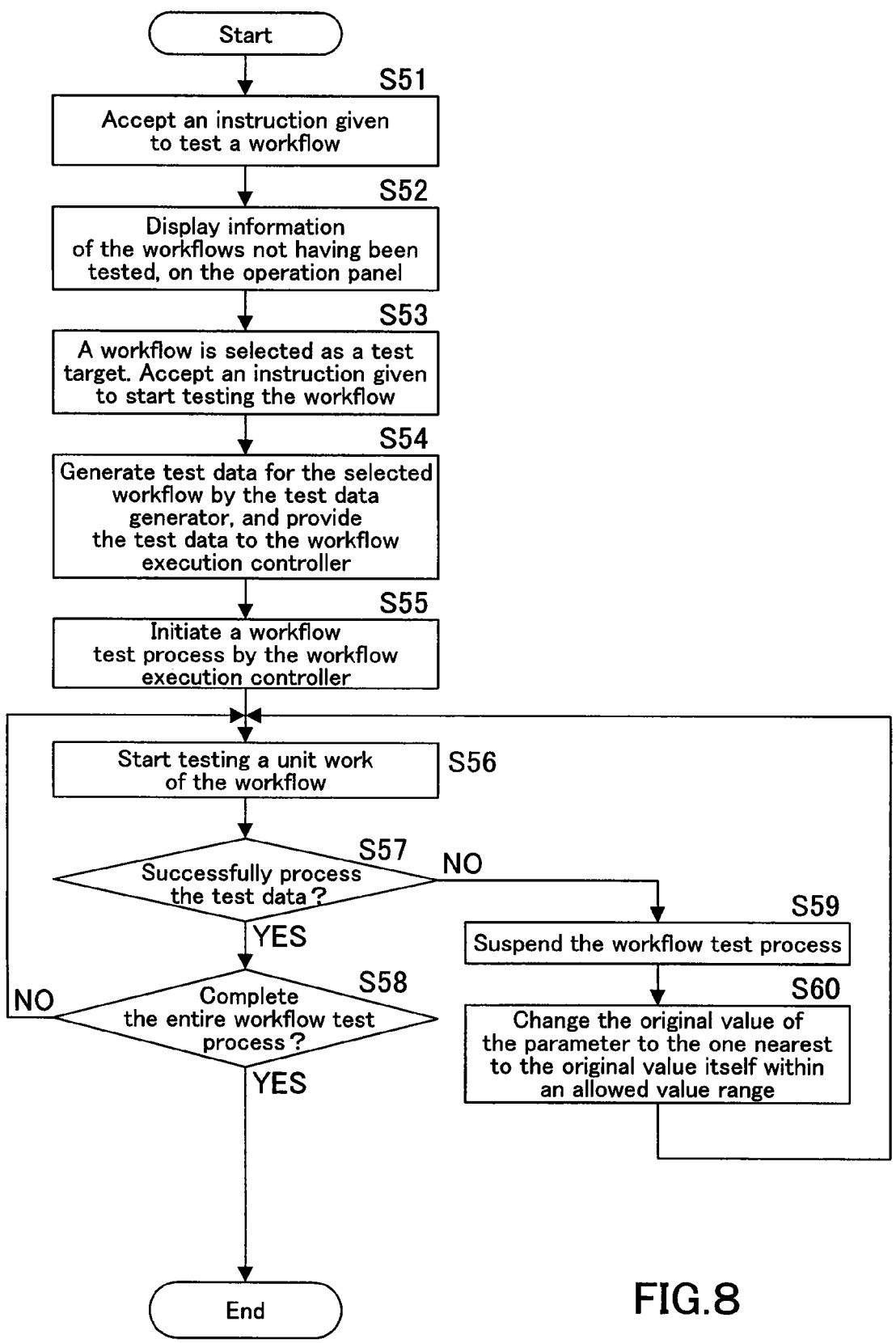
FIG. 8 is a flowchart showing a procedure executed in the image processing apparatus, to modify parameters automatically.

FIG. 8 is a flowchart showing a procedure executed in the MFP 1, to modify parameters automatically.

As shown in FIG. 8, a user gives an instruction to test a workflow via the operation panel 13, and this instruction is accepted in Step S51. In Step S52, information of the workflows not having been tested is obtained from the workflow record administrator 20, and the workflows are listed on the operation panel 13. Then, the user selects a workflow as a test target from those not having been tested and gives an instruction to start executing a test process, and this instruction is accepted in Step S53.

In Step S54, test data is generated by the test data generator 21 for the selected workflow and given to the workflow execution controller 19. Then a workflow test process is initiated by the workflow execution controller 19 in Step S55, and a unit work of the workflow is started to be tested, in Step S56.

Subsequently in Step S57, it is judged whether or not the test data is successfully processed. If it is successfully processed (YES in Step S57), then it is judged in Step S58 whether or not the entire workflow test process is completed.

If it is completed (YES in Step S58), the routine terminates. If it is not yet completed (NO in Step S58), the routine returns to Step S56 and starts testing a following unit work of the workflow.

If the test data is not successfully processed due to parameter mismatch (NO in Step S57), the workflow test process is suspended in Step S59. Then in Step S60, the original values of the parameters set on the unit work is changed to the ones nearest to the original values within an allowed value range, in Step S60. Then, the routine returns to Step S56 and starts testing the unit work again with the modified parameters.

As described above in this embodiment, if a workflow test process is not successfully executed in the MFP 1, parameters are automatically modified and a user does not have to enter appropriate parameters manually, which would improve user convenience.

In this embodiment, the MFP can have the function to let a user register test data preliminarily and select among a plurality of test data, in order to test a workflow.

Further, when a user intends to register a workflow for regular use, the workflow can be permitted to be registered only if it has been tested already, which could prevent a trouble arising when the workflow is executed.

Figure 9:
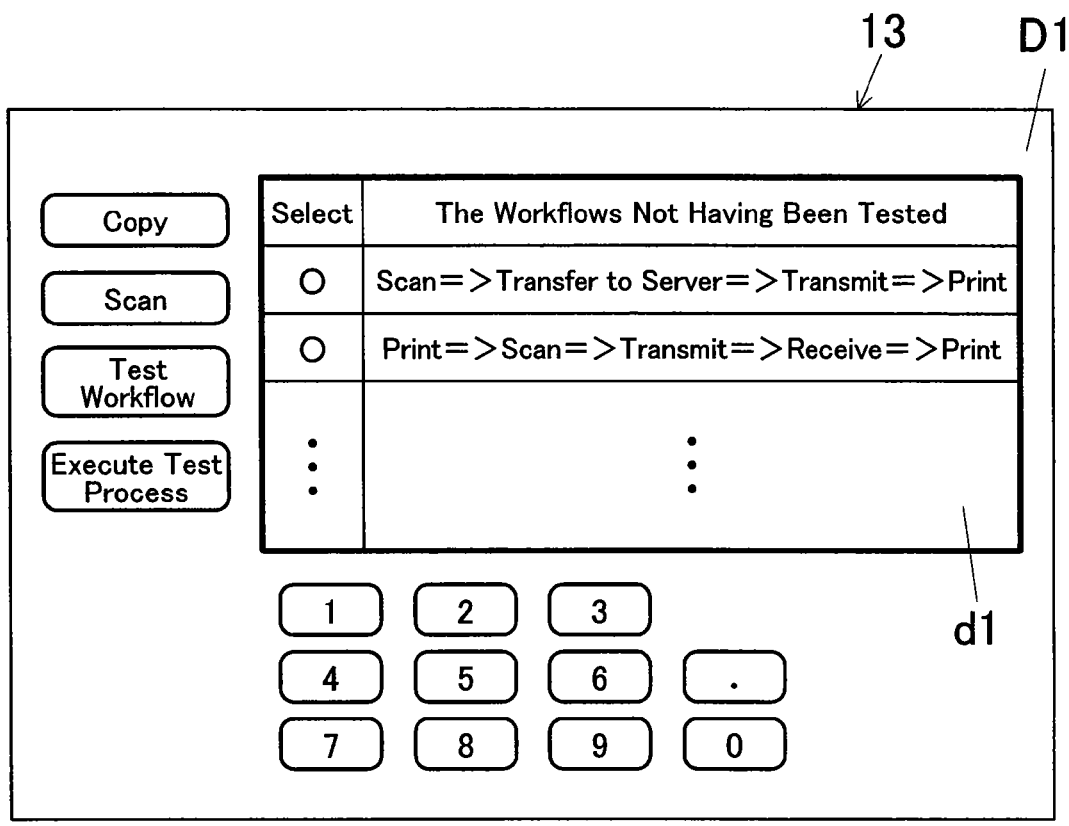
FIG. 9 shows a screen displayed on an operation panel, via which a workflow is selected as a test target.

FIG. 9 shows a display screen displayed on the operation panel 13, via which a user selects a workflow as a test target.

When a user presses a "test workflow" button in the left of this screen D1 shown in FIG. 9, a workflow selection screen d1 showing the workflows not having been tested comes up to the screen D1.

Then, the user selects a workflow as a test target by pressing the mark "○" (a touch button) thereof in the "select" column. After the workflow selection, the screen switches from the screen D1 with the workflow selection screen d1, to a screen D2 shown in FIG. 10.

Figure 10:
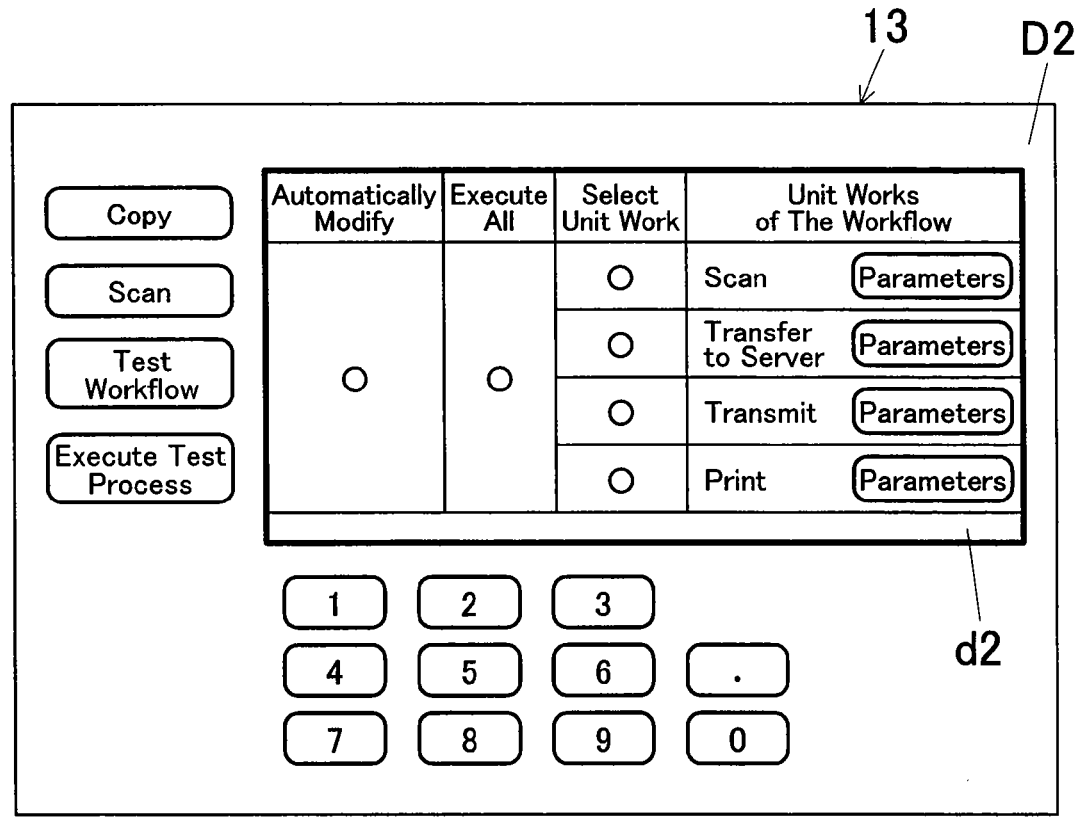
FIG. 10 shows a screen via which unit works are selected to test a workflow.

FIG. 10 is a screen via which unit works are selected as test targets.

As shown in FIG. 10, a unit work selection screen d2 is displayed in the screen D2. A user gives an instruction to test a unit work of a workflow by pressing the mark "○" thereof in the "select unit work" column of the unit work selection screen d2, then pressing the "execute test process" button in the left of the screen D2. Alternatively, a user gives an instruction to test all the unit works of a workflow by pressing the mark "○" in the "execute all" column of the unit work selection screen d2, then pressing the "execute test process" button in the left of the screen D2.

Furthermore, if a user selects the mark "○" in the "automatically modify" column of the unit work selection screen d2, then parameters are modified automatically in response to unexpected occurrence of an trouble during a test process, and thereby an entire workflow test process is successfully executed.

When a user would like to refer to parameters, he/she can press a "parameters" button in the "unit works of workflow" column of the unit work selection screen d2, and thereby parameters set on the step are displayed.

In this embodiment, the MFP 1 can be configured to create in itself a table to administer information set for respective users about "notify of trouble" and "permit parameter setting" according to which the respective users are notified of a trouble if it happens during a test process.

Figures 11, 12:
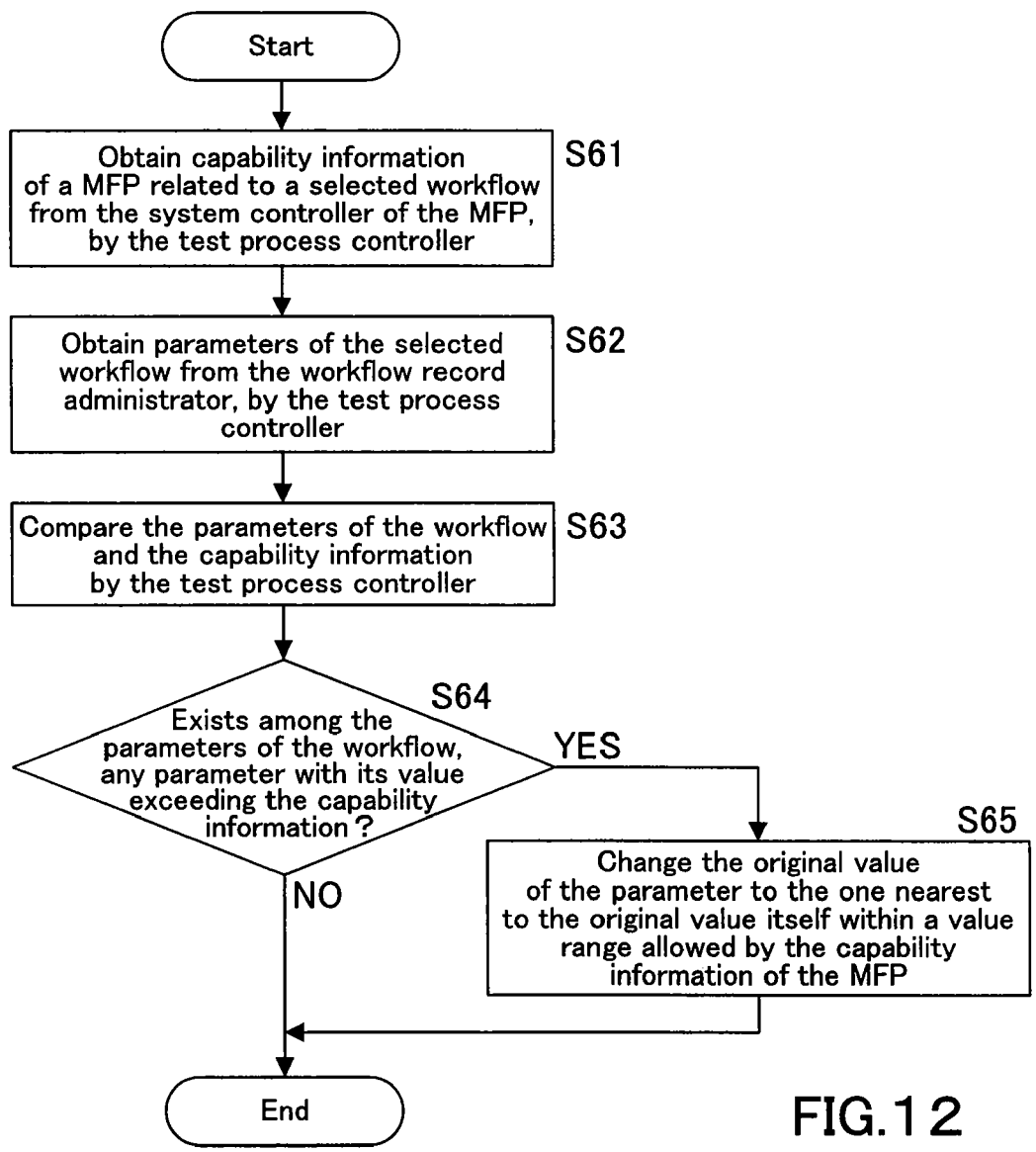
FIG. 11 shows an administration table that administers information set for respective users about "notify of trouble" and "permission for parameter modification", which is used if a trouble happens during a workflow test process.
FIG. 12 is a flowchart showing a procedure executed when test data is generated, to modify parameters automatically based on capability information of the apparatus itself.

FIG. 11 shows an example of an administration table that administers information set for respective users about "notify of trouble" and "permit parameter setting", which is used if a trouble happens during a workflow test process.

As shown in FIG. 11, the table has the "notify of trouble" and "permit parameter setting" columns for the respective users, and the "notify of trouble" column has two fields for "set" indicating whether or not to notify the users and "method" indicating a method to notify.

For example, prohibition is set for the user "SATO" both about "set" of "notify of trouble" and "permit parameter setting" (prohibition is indicated by the mark"x"), and there is no setting for this user about "method" of "notify of trouble".

Permission is set for the user "TANAKA" both about "set" of "notify of trouble" and "permit parameter setting" (permission is indicated by the mark "○"). According to the setting for the user "TANAKA" about "method" of "notify of trouble", he/she is notified via the operation panel 13 and an e-mail.

FIG. 12 is a flowchart showing a procedure executed in the MFP 1 if test data is generated, to modify parameters automatically based on capability information of the MFP 1.

As shown in FIG. 12, capability information of the MFP 1 related to a selected workflow is obtained by the test process controller 18, from the system controller 15 of the MFP 1, in Step S61. Then in Step S62, parameters of the workflow are obtained by the test process controller 18 from the workflow record administrator 20.

Subsequently, the parameters of the workflow and the capability information are compared by the test process controller 18 in Step S63, and it is judged in Step S64 whether or not there is among the parameters of the workflow, any parameter with its value exceeding the capability information.

If there is among the parameters of the workflow, no parameter with its value exceeding the capability information (NO in Step S64), the routine terminates. If there is among the parameters of the workflow, any parameter with its value exceeding the capability information (YES in Step S64), the original value is changed to the one nearest to the original value itself within a value range allowed by the capacity information of the MFP 1, in Step S65. Then the routine terminates.

As described above in this embodiment, original parameters are automatically modified in the MFP 1 based on capability information of the MFP 1, and a user does not have to change parameters manually, which would improve user convenience.

Figure 13:
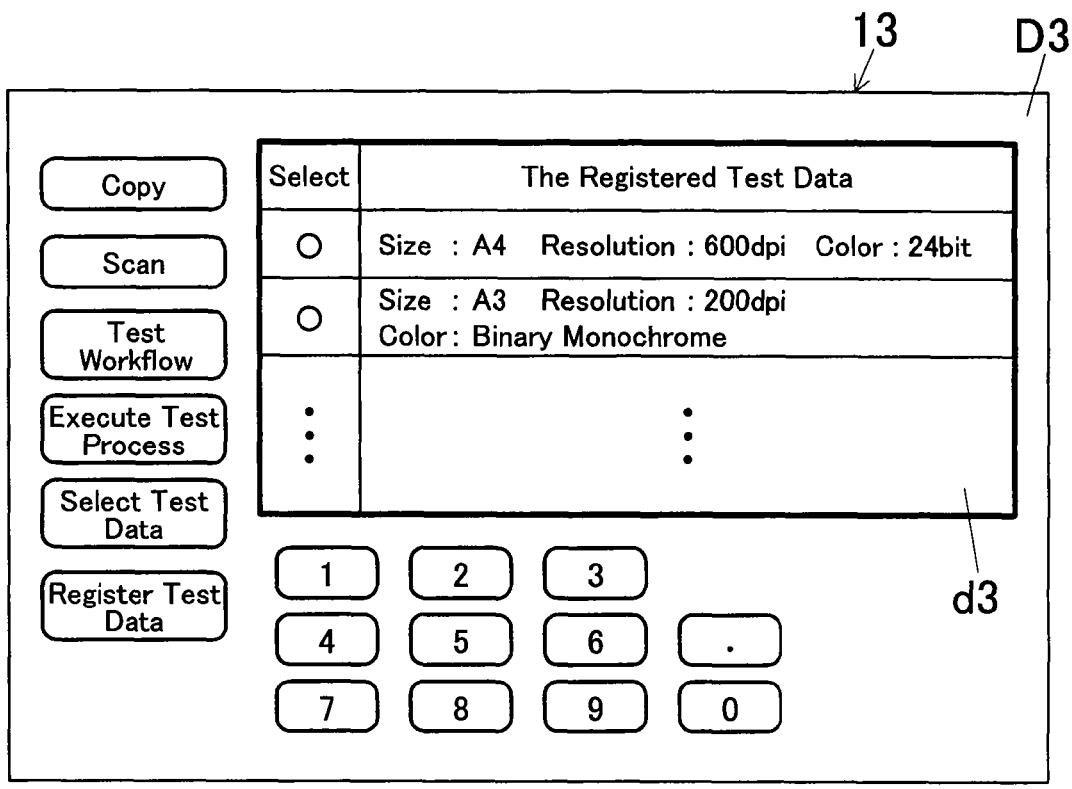
FIG. 13 shows a selection screen via which registered test data is selected.

FIG. 13 is a selection screen D3 displayed on the operation panel 13, via which test data is selected.

In FIG. 13, when a user presses the "test workflow" button in the left of the screen D3 then presses a "select test data" button, a registered test data screen d3 comes up to the screen D3.

Via the registered test data screen d3, the user selects registered test data by touching the mark "○" thereof in the "selection" column.

Figure 14:
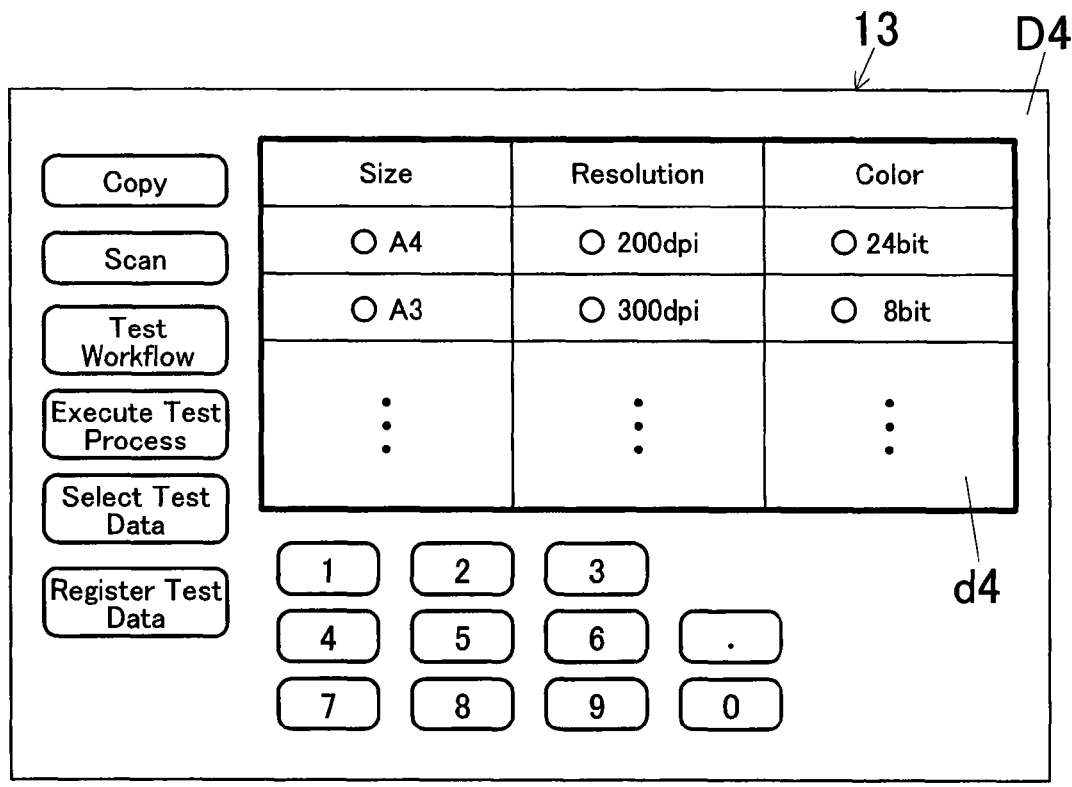
FIG. 14 shows a registration screen via which test data is registered.

FIG. 14 shows a screen D4 via which test data is registered.

As shown in FIG. 14, a screen d4 via which "size", "resolution" and "number of color bits" are set as test data, is displayed in the screen D4.

Via the setting screen d4, the user gives selects a preferable option (by touching the mark "○") about "size", "resolution" and "number of color bits" then presses a "register test data" button in the left of the screen D4. And the setting is recorded in the storage 14 to be administered by the workflow record administrator 20.

In this embodiment, the MFP 1 can be configured to examine whether or not a workflow has been tested when a user gives an instruction to execute the workflow, and prohibit the workflow from being executed if it has not been tested.

Figure 15:
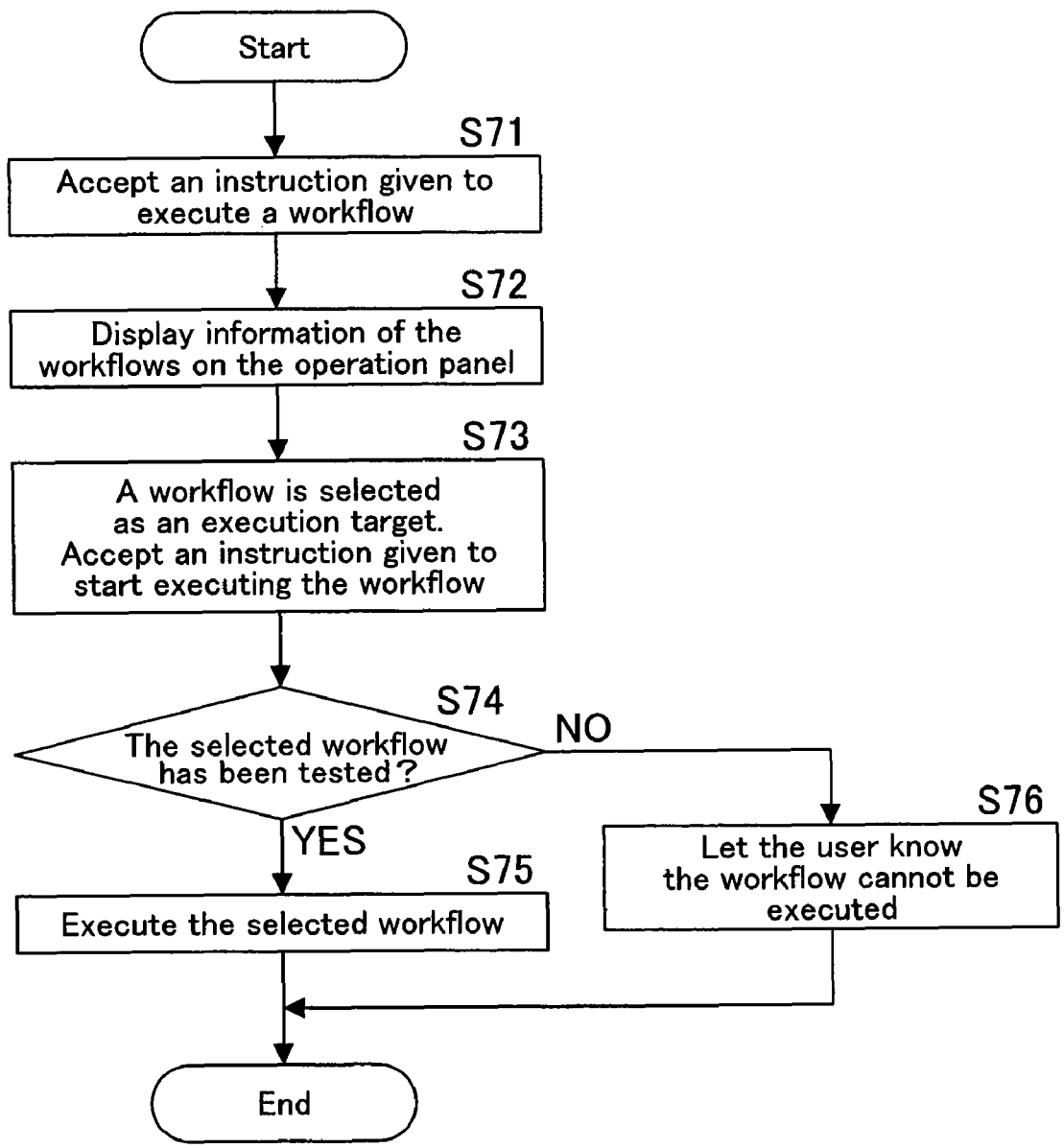
FIG. 15 is a flowchart showing a procedure to make a workflow executed or not executed, depending on a judgment whether or not the workflow has been tested.

FIG. 15 is a flowchart showing a control procedure to judge whether or not to execute a specified workflow depending on a judgment whether or not the workflow has been tested.

As shown in FIG. 15, a user gives an instruction to execute a workflow via the operation panel 13, and this instruction is accepted in Step S71. In Step S72, information of the workflows is obtained from the workflow record administrator 20, and the workflows are listed on the operation panel 13. Then, the user selects a workflow to execute, from those listed thereon and gives an instruction to start executing the workflow, and this instruction is accepted in Step S73.

In Step S74, it is judged whether or not the selected workflow has been tested. If the selected workflow has been tested (YES in Step S74), the selected workflow is executed in Step S75, then the routine terminates. If the selected workflow has not been tested (NO in Step S74), a message is displayed on the operation panel 13 to let the user know that the workflow cannot be executed, in Step S76.

As described above in this embodiment, a workflow not having been tested cannot be executed, which would prevent a trouble possibly happening if a user gives an instruction to execute a workflow without knowing that it hasn't been tested.

Figure 16:
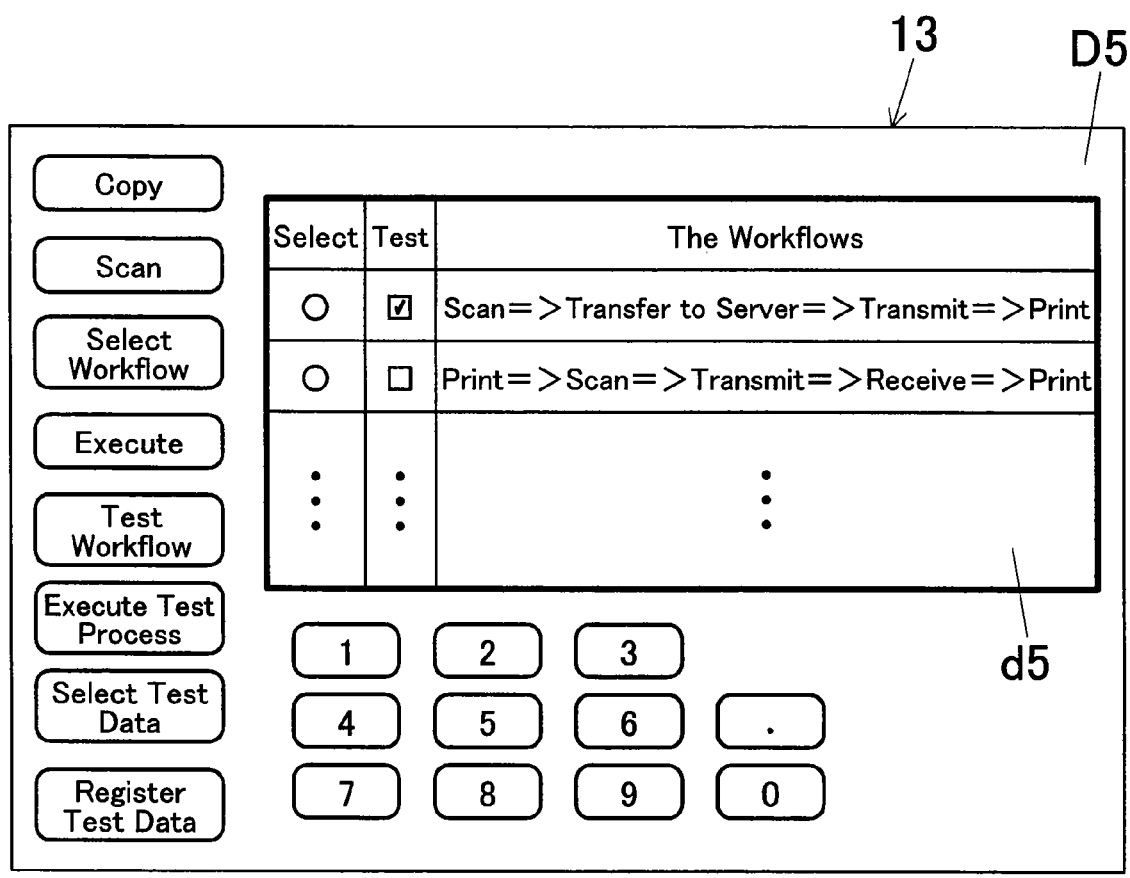
FIG. 16 shows a selection screen via which a user selects a workflow to execute.

FIG. 16 shows a selection screen D5 via which a user selects a workflow to execute.

In FIG. 16, when a user presses a "select workflow" button in the left of this screen D5, a screen d5 comes up to the right thereof.

The user selects a workflow to execute, from those listed in the screen d5, then presses the "execute test process" button in the left of the screen D5, and thereby the workflow is executed.

There is the "test" column in the screen d5, which indicates whether or not the respective workflows have been tested. As shown in this example, a workflow with a check mark given to its check box in this column has been tested. In this embodiment, it can be configured such that only the workflows having been tested are listed in the screen, so that a user could not select other than those workflows.

Figure 17:
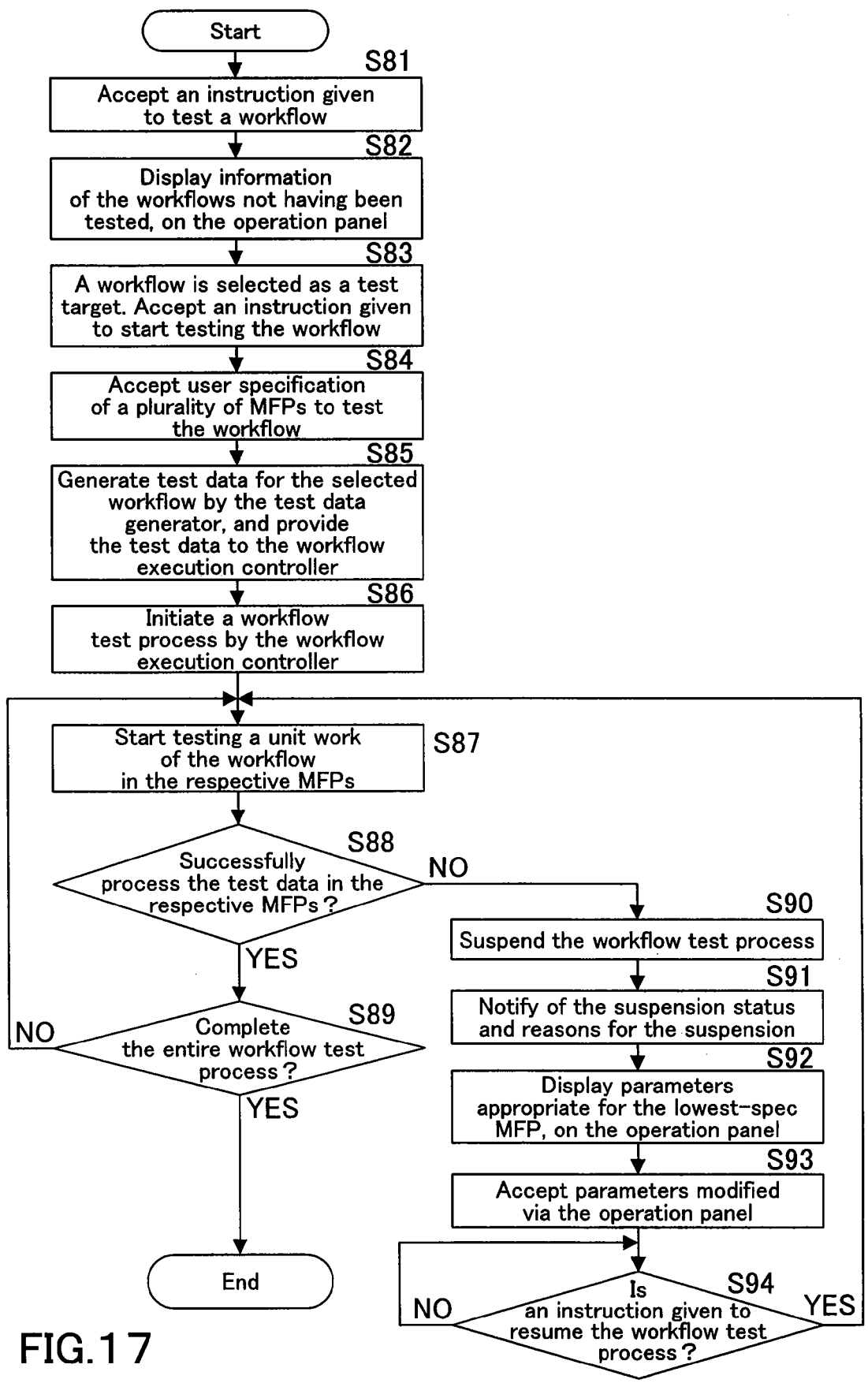
FIG. 17 is a flowchart showing a procedure to make a plurality of external apparatuses execute a workflow test process.

FIG. 17 is a flowchart showing a procedure executed in a plurality of external apparatuses, to test a workflow.

As shown in FIG. 17, a user gives an instruction to test a workflow via the operation panel 13, and this instruction is accepted in Step S81. In Step S82, information of the workflows not having been tested is obtained from the workflow record administrator 20, and the workflows are listed on the operation panel 13. Then, the user selects a workflow as a test target from those listed thereon and gives an instruction to start executing a test process, and this instruction is accepted in Step S83.

Subsequently, the user specifies a plurality of MFPs to test the workflow via the operation panel 13, and this specification is accepted in Step S84. Then test data is generated by the test data generator 21 for the selected workflow and provided to the workflow execution controller 19, in Step S85. And by the workflow test execution controller 19, a workflow test process is initiated in Step S86, and a unit work of the workflow is started to be tested in the respective specified plurality of MFPs, in Step S87.

In Step S88, it is judged whether or not the test data is successfully processed in the respective MFPs. If the test data is successfully processed in the respective MFPs (YES in Step S88), then it is judged in Step S89 whether or not the entire workflow test process is completed. If it is completed (YES in Step S89), the routine terminates. If it is not yet completed (NO in Step S89), the routine returns to Step S87 and continues the workflow test process.

If the test data is not successfully processed in the respective MFPs (NO in Step S88), the workflow test process is suspended in Step S90. Then in Step S91, the status indicating the workflow test process is suspended and reasons for the suspension are displayed on the operation panel 13 to let the user know.

In Step S92, parameters appropriate for the lowest-spec MFP are displayed on the operation panel 13, and the user modifies the parameters via the operation panel 13 in Step S93. Then it is judged in Step S94 whether or not an instruction is given by the user to resume the workflow test process.

If an instruction is not given to resume the workflow test process (NO in Step S94), the routine waits until it is given. If an instruction is given to resume the workflow test process (YES in Step S94), the routine returns to Step S87 and resumes the workflow test process.

As described above in this embodiment, a workflow would be successfully executed in any of MFPs if it has been already tested in all of the MFPs, which would improve user convenience.

Figure 18:
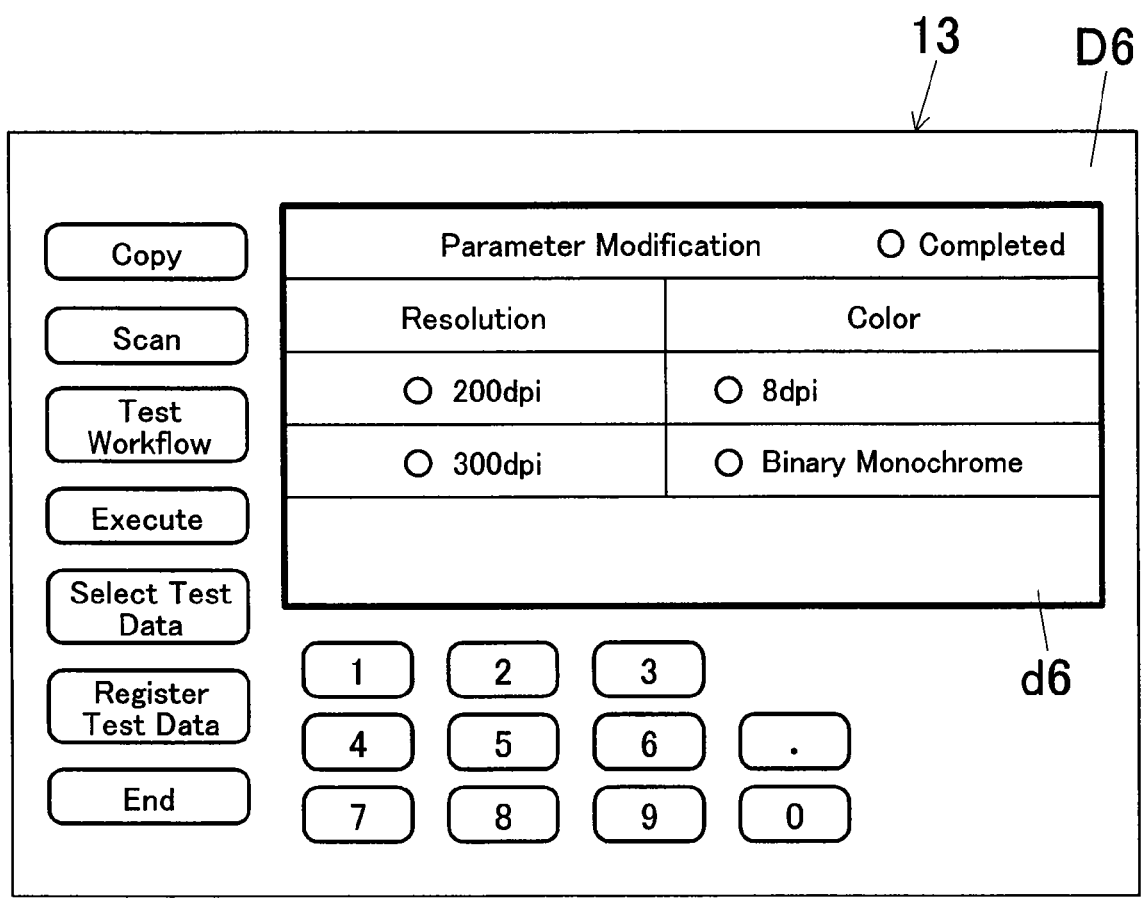
FIG. 18 shows a screen via which a user enters appropriate parameters if a trouble happens during a workflow test process.

FIG. 18 shows an entry screen via which a user enters appropriate parameters if a trouble happens during a workflow test process.

In this embodiment, a trouble happens due to the "resolution" and the "number of color bits" of image data, and an entry screen d6 is shown in the screen D6 of FIG. 18 to let the user modify parameters of the "resolution" and the "number of color bits" of the image data.

Appropriate two options for capabilities of the MFP 1 or MFP 2, are listed each for "resolution" and "number of color bits" in the entry screen d6, and a user can select a preferable option from those listed therein about "resolution" and "number of color bits".

The user selects a preferable option about "resolution" and "number of color bits" then presses an "end" button, and thereby appropriate parameters are entered and a workflow test process is executed with the appropriate parameters.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
    a test data generator that generates test data instead of actual data entered for executing a workflow consisting of a plurality of unit works, if an instruction is given to test the workflow;
    a test process executor that executes a test process by processing the generated test data according to parameters for executing the unit works;
    a test process suspender that suspends the test process if a trouble happens during the test process;
    a notifier that notifies a user of a trouble if it happens during the test process;
    a parameter modifier that is capable of modifying the parameters if the test process is suspended due to the trouble; and
    a test process resuming portion that resumes the test process after the parameters are modified.

2. The image processing apparatus as recited in claim 1, wherein at least one of the unit works constituting the workflow is executed in an external image processing apparatus set up on a network, and
    the test process suspender suspends the test process;
    the notifier notifies the user of the trouble;
    the parameter modifier modifies the parameters; and
    the test process resuming portion resumes the test process, according to a notice received from the external image processing apparatus, if a trouble happens while the test process is being executed in the external image processing apparatus.

3. The image processing apparatus as recited in claim 1, wherein any of the unit works constituting the workflow can be specified as a test target.

4. The image processing apparatus as recited in claim 1, wherein the parameter modifier modifies the parameters in an automatic manner or according to user entry operations.

5. The image processing apparatus as recited in claim 1, wherein users who are permitted to receive a notice of the trouble and modify parameters if the trouble happens, are preliminarily specified.

6. The image processing apparatus as recited in claim 1, wherein the parameters are modified based on capability information of the image processing apparatus.

7. The image processing apparatus as recited in claim 1, further comprising:
    a selector that lets the user select test data; and
    a register that lets the user register test data.

8. The image processing apparatus as recited in claim 1, further comprising:
    a judger that judges whether or not a workflow that an instruction is given to execute, has been tested; and
    an execution controller that executes the workflow only if it is judged that the workflow has been tested.

9. The image processing apparatus as recited in claim 1, wherein the test process executor makes a plurality of external image processing apparatuses execute the test process, and the parameter modifier modifies the parameters for any of the external image processing apparatuses if a trouble happens therein.

10. An image processing apparatus comprising:
    a receiver that receives test data for executing a workflow and parameters for executing unit works constituting the workflow, which are transmitted from another image processing apparatus;
    a test process executor that executes a test process by processing the received test data according to the parameters; and
    a transmitter that transmits a notice of a trouble to the other image processing apparatus, if the trouble happens while the test process executor is executing the test process.

11. A workflow testing method comprising:
    generating test data instead of actual data entered for executing a workflow consisting of a plurality of unit works, if an instruction is given to test the workflow;
    executing a test process by processing the generated test data according to parameters for executing the unit works;
    suspending the test process if a trouble happens during the test process;
    notifying a user of a trouble if it happens during the test process;
    modifying the parameters if the test process is suspended due to the trouble; and
    resuming the test process after the parameters are modified.

12. A workflow testing program stored in a computer readable recording medium to make a computer execute:
    generating test data instead of actual data entered for executing a workflow consisting of a plurality of unit works, if an instruction is given to test the workflow;
    executing the test process by processing the test data according to parameters for executing the unit works;
    suspending the test process if a trouble happens during the test process;
    notifying a user of a trouble if it happens during the test process;
    modifying the parameters if the test process is suspended due to the trouble; and
    resuming the test process after the parameters are modified.

* * * * *